United States Patent [19]
Hashimoto et al.

[11] Patent Number: 6,045,901
[45] Date of Patent: Apr. 4, 2000

[54] MAGNETIC RECORDING MEDIUM

[75] Inventors: Hiroshi Hashimoto; Toshio Ishida; Yuichiro Murayama, all of Odawara, Japan

[73] Assignee: Fuji Photo Film Co., Ltd., Kanagawa, Japan

[21] Appl. No.: 08/788,775

[22] Filed: Jan. 24, 1997

[30] Foreign Application Priority Data

Jan. 24, 1996 [JP] Japan ................................. 8-010212

[51] Int. Cl.$^7$ .................................................. G11B 5/702
[52] U.S. Cl. ............... 428/323; 428/425.9; 428/694 BU; 428/694 BA; 428/694 BG; 428/694 BS; 428/900
[58] Field of Search ................ 428/425.9, 694 BG, 428/694 BP, 694 BS, 900, 323, 694 BU, 694 BA

[56] References Cited

U.S. PATENT DOCUMENTS 4,696,869  9/1987  Funahashi et al. ..................... 428/695
5,700,541  12/1997  Okita et al. ............................ 428/65.4

*Primary Examiner*—Stevan A. Resan
*Attorney, Agent, or Firm*—Sughrue, Mion, Zinn, Macpeak & Seas, PLLC

[57] ABSTRACT

The present invention provides a magnetic recording medium, which comprises a magnetic layer having ferromagnetic powder and a binder dispersed in it and placed on a non-magnetic support member, wherein said binder contains polyurethane resin having a polar group and also contains a diester compound given by the following structural formula as a lubricant, said medium having high repeated running durability and high still durability:

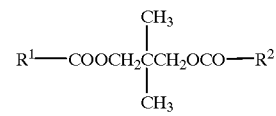

where $R^1$ and $R^2$ each represents a hydrocarbon group having 5 to 21 carbon atoms.

18 Claims, No Drawings

MAGNETIC RECORDING MEDIUM

BACKGROUND OF THE INVENTION

The present invention relates to a magnetic recording medium, comprising a magnetic layer having ferromagnetic fine particles and a binder dispersed in it and placed on a non-magnetic support member, whereby said magnetic recording medium has very high electromagnetic transfer characteristics and high durability.

The magnetic recording medium is widely used in tape for tape recording, video tape, floppy disk, etc. In the magnetic recording medium, a magnetic layer where ferromagnetic powder is dispersed in a binder is deposited on a non-magnetic support member.

The magnetic recording medium must be at high level in various characteristics such as electromagnetic transfer characteristics, running durability and running performance. Namely, an audio tape for recording and reproducing musical sound must have higher ability to reproduce original sound. A video tape must have excellent electromagnetic transfer characteristics such as high ability to reproduce original image. In particular, a magnetic recording medium for digital video tape recorder, which must be suitable for high density recording, must have higher electromagnetic transfer characteristics.

In addition to the excellent electromagnetic characteristics as described above, the magnetic recording medium must have good running durability as already described. To ensure good running durability, abrasive and lubricant are added in the magnetic layer.

However, to obtain good running durability by the use of abrasive, it is necessary to increase the quantity of the added abrasive to some extent. As a result, filling degree of the ferromagnetic powder decreases. In case an abrasive material having larger particle size is used to obtain good running durability, the abrasive material is more likely to protrude or to produce roughness on the surface of the magnetic layer. Therefore, the improvement of running durability by the use of abrasive often leads to deterioration of the electromagnetic transfer characteristics.

When it is tried to improve the running durability by the use of lubricant, it is necessary to increase the quantity of the added lubricant. As a result, the binder is more likely to be plasticized, and the durability of the magnetic layer tends to decrease.

In particular, in a device using magnetic recording medium for high density recording, the number of revolutions of magnetic head is increased. In a digital video tape recorder, the number of revolutions of magnetic head is 9600 rpm, and this is extremely higher when compared with that of a recorder for home use (1800 rpm) or that of a recorder for business use (5000 rpm). In this respect, higher durability is required for this purpose. Above all, there are strong demands on the improvement of anti-abrasive property of the medium against friction on a rotating head in still operation.

Also, to improve the durability and the electromagnetic transfer characteristics, the binder, serving as a major component of the magnetic layer, also plays an important role. The materials used in the past such as vinyl chloride resin, cellulose resin, urethane resin, acrylic resin, etc. are low in anti-abrasive property of the magnetic layer, and this often results in contamination of running components of the magnetic tape.

To overcome the above problems, a method to use hard binder and to increase hardness of the magnetic layer is adopted.

For example, JP(A) 59065931 discloses a magnetic recording medium, which uses diester of carboxylic acid with neopentyl glycol, trimethylolpropane, pentaerythritol, etc. and denatured ester of ethylene oxide. However, the magnetic recording medium of this type is insufficient in repeated running durability when it is applied for high density recording as currently performed, and problems such as head contamination, output decrease, etc. arise.

JP(B) 6618063 describes a magnetic recording medium, which comprises a binder of a compound having polyurethane bond and a magnetic layer where diester of carboxylic acid with dihydric alcohol is added. Also, JP(B) 7214648 describes a magnetic recording medium using diester of aliphatic dicarboxylic acid. JP(A) 5680829 discloses the use of aliphatic dibasic acid having a specific chemical structure as lubricant, and JP(A) 59028236 discloses the use of dibasic acid ester having a specific number of carbon atoms as lubricant. Further, JP(A) 59186129 describes a magnetic recording medium where dioleyl maleate is present in the surface.

However, the lubricating materials disclosed in the prior art as described above are disadvantageous in that resistance to hydrolysis is low and storage stability is inferior (e.g. decrease of durability) when it is stored for long time under high temperature and high humidity conditions. Also, when these lubricating materials are applied on a tape for high density recording as currently performed or in a tape for digital video tape recorder, repeated running durability and still durability are not satisfactory.

To solve the above problems, it is an object of the present invention to provide a magnetic recording medium, which has high repeated running durability, high still durability and excellent running durability at high temperature and high humidity conditions and high storage stability under high temperature and high humidity conditions, and also to provide a magnetic recording medium suitable for high density recording and for digital video tape recorder.

SUMMARY OF THE INVENTION

The magnetic recording medium of the present invention comprises a magnetic layer with ferromagnetic fine powder and a binder dispersed in it and placed on a non-magnetic support member, whereby said binder contains polyurethane resin having a polar group and also contains a diester compound given by the following structural formula as a lubricating material:

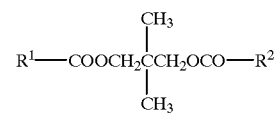

where $R^1$ and $R^2$ each represents a hydrocarbon group having 5 to 21 carbon atoms.

Also, the present invention provides the magnetic recording medium as described above, wherein it contains at least one of either aromatic ring polyurethane resin or cycloaliphatic ring polyurethane resin by 2 to 9 mmol/g, and the polar group is at least one type selected from carboxylic acid, sulfonic acid, phosphoric acid and salt of these acids, sulfobetaine, carbobetaine, amine, or ammonium base and is contained by $1\times10^{-6}$ to $2\times10^{-4}$ eq/g to the polyurethane resin.

Also, the present invention provides the magnetic recording medium as described above, wherein a lower layer comprising inorganic non-magnetic powder dispersed in a binder is placed between the non-magnetic support member and the magnetic layer, and the magnetic layer is not more than 1 µm in thickness.

DESCRIPTION OF THE PREFERRED EMBODIMENTS

In the diester compound used in the magnetic recording medium of the present invention, $R^1$ and $R^2$ each represents a hydrocarbon group having 5 to 21 carbon atoms, either branched or straight chain, and may contain unsaturated bond. It is preferable that $R^1$ and $R^2$ have the same structure, and more preferably, it is a saturated straight chain group or a saturated branched alkyl group.

The number of carbon atoms is 5 to 21, or more preferably 7 to 17, or most preferably 9 to 13. If the number of carbon atoms is fewer than the above, the compound is too volatile. When temperature is increased due to friction, its content on the surface of the magnetic layer decreases, resulting in lower durability. On the other hand, if it is more than the above, viscosity increases, resulting in lower fluid lubricating property and lower durability.

The content of the diester compound is preferably 0.1 to 10 parts to 100 parts of the magnetic substance, or more preferably 1 to 5 parts in case the magnetic recording medium of the present invention is a single-layer magnetic layer. If the content increases, sticking may occur at low-speed friction.

Also, in case the magnetic layer comprises either a lower magnetic layer or a lower non-magnetic layer and an upper magnetic layer, it may be added to any of the upper layer or the lower layer, or to both. Even when it is added only to the lower layer, it migrates to the upper layer, and the lubricating material permeates to the surface of the magnetic layer and provides effect. Similarly to the case of the single layer, the adding quantity is 0.1 to 10 weight parts to 100 weight parts of the magnetic substance or the non-magnetic powder, or more preferably 1 to 5 weight parts.

In the magnetic recording medium of the present invention, the following substances may be added further: fatty acid, substance other than diester of the present invention such as fatty acid ester, silicone oil, graphite, molybdenum disulfide, boron nitride, graphite fluoride, fluorine alcohol, polyolefin, polyglycol, alkyl phosphoric acid ester, tungsten disulfide, etc.

In the polyurethane containing the polar group used in the magnetic recording medium of the present invention, a polar group such as $-SO_3M$, $-SO_4M$, $-OPO(OM)_2$, $-PO(OM)_2$, $-COOM$, sulfobetaine group, carbobetaine group, amine, ammonium base, etc. may be used.

The content of the polar group in polyurethane is preferably $1\times10^{-6}$ to $2\times10^{-4}$ eq/g, or more preferably $1\times10^{-5}$ to $2\times10^{-4}$ eq/g. If it is lower than $1\times10^{-6}$ eq/g, durability decreases. If it is more than $2\times10^{-4}$ eq/g, smoothness decreases, and electromagnetic transfer characteristics will be lowered.

The polyurethane preferably contains either one of aromatic ring or cycloaliphatic ring by 2 to 9 mmol/g, or more preferably 4 to 7 mmol/g. Benzene ring is preferably used as the aromatic ring, and cyclohexane ring is preferably used as the cycloaliphatic ring. By the ring structure, compatibility with diester compound can be suppressed to lower level, and mechanical strength of coating film can be increased. If it is more than 9 mmol/g, the coating film becomes fragile and this is not desirable. The aromatic ring or the cycloaliphatic ring may be contained in any of long-chain polyol component, chain extender, or diisocyanate component.

The polyurethane of the present invention may have a structure of any of the following compounds: polyester urethane, polyether urethane, polyetherester urethane or polycarbonate urethane.

To increase concentration of the ring structure, it is preferable to use aromatic polyester polyol, aromatic/cycloaliphatic polyester polyol, aromatic glycol denatured polyether polyol, cycloaliphatic glycol denatured polyether polyol, etc. as polyol. It is also preferable to add more quantity of aromatic or cycloaliphatic diol as chain extender to increase concentration of the ring structure in the entire compound.

As the aromatic or cycloaliphatic polyesterpolyol, it is preferable to use polyester polyol, which primarily comprises cycloaliphatic glycol of phthalic acid, isophthalic acid, terephthalic acid, aromatic dicarboxylic acid such as naphthalene dicarboxylic acid, cyclohexanediol, cyclohexanedimethanol, etc. With these compounds, ethylene glycol, 1,3-propanediol, propylene glycol, neopentyl glycol, 1,3-propanediol, propylene glycol, neopentyl glycol (NPG), 1,4-butanediol, 1,5-pentanediol, 1,6-hexanediol, 1,8-octanediol, 1,9-nonanediol, diethylene glycol, dipropylene glycol, etc. may be used simultaneously as aliphatic glycol, and succinic acid, adipic acid, sebacic acid, or azelaic acid may be simultaneously used as the aliphatic carboxylic acid.

As the polyetherpolyol having ring structure, it is preferable to use a compound, which is obtained by adding alkylene oxide to bisphenol A, bisphenol S, bisphenol P, bisphenol F or hydrogenated compound of these compounds. As the alkylene oxide, ethylene oxide, propylene oxide, etc. may be used, while it is preferable to use propylene oxide because of high solubility in solvent. Molecular weight of these compounds is preferably 500 to 1,000.

Further, as low molecular chain extender having ring structure, it is preferable to use cyclohexanedimethanol, cyclohexanediol, bisphenol A, hydrogenated bisphenol A, etc.

Further, as the diisocyanate component, a compound having a ring structure already known is used. It is preferable to use TDI (tolylene diisocyanate), MDI (diphenylmethane diisocyanate), p-phenylene diisocyanate, o-phenylene diisocyanate, m-phenylene diisocyanate, xylylene diisocyanate, hydrogenated xylylene diisocyanate, isophorone diisocyanate, etc.

Number average molecular weight of the polyurethane is preferably 5,000 to 100,000, or more preferably 10,000 to 50,000, or most preferably 15,000 to 40,000. If it is less than 5,000, strength of the coating film decreases, resulting in lower durability. If it is more than 100,000, solubility in solvent decreases, resulting in lower dispersion property.

Glass transition temperature (Tg) of the polyurethane is preferably 0° C. to 200° C., or more preferably 30° C. to 150+ C., or most preferably 70° C. to 130° C. If it is lower than 0° C., strength of the coating film at high temperature decreases, resulting in lower durability and poor storage property. If it is higher than 200° C., calender workability decreases, resulting in lower electromagnetic transfer characteristics.

The number of OH groups in the polyurethane is preferably 3 to 20 per molecule, or more preferably 4 to 15 per molecule. If it is less than 3 per molecule, reactivity with isocyanate curing agent is low, resulting in lower coating film strength and lower durability. On the other hand, if it is more than 15 per molecule, solubility in solvent decreases, resulting in lower dispersion property. As the compound used for adding OH, trimethylolethane, trimethylolpropane, trimellitic acid anhydride, glycerine, pentaerythritol, hexanetriol, branched polyester having more than 3 functional OH groups or polyester having more than 3 functional OH groups may be used. Above all, it is preferable to use the compound having 3 functional groups. If it has 4 or more functional groups, reaction with the curing agent is too quick, and this results in shorter pot life.

Concentration of the urethane group is preferably 1.0 to 6.0 mmol/g, or more preferably 1.5 to 4.5 mmol/g. If it is lower than the lower limit, mechanical strength decreases. If it is more than the upper limit, dispersion property decreases.

In case curing is performed by electron beam irradiation, a compound having reactive double bond such as urethane acrylate may be used.

Total weight of resin component and curing agent (i.e. weight of the binder) is preferably within the range of 15 to 40 weight parts to 100 weight parts of ferromagnetic powder, or more preferably 20 to 30 weight parts.

The ferromagnetic powder used in the magnetic recording medium of the present invention is powder of ferromagnetic iron oxide, cobalt-containing ferromagnetic iron oxide or ferromagnetic alloy, and $S_{BET}$ specific surface area is 40 to 80 m$^2$/g, or more preferably 50 to 70 m$^2$/g. Crystallite size is preferably 12 to 25 nm, or more preferably 13 to 22 nm, or most preferably 14 to 20 nm. The length of longer axis is preferably 0.05 to 0.25 µm, or more preferably 0.07 to 0.2 µm, or most preferably 0.08 to 0.15 µm. As the ferromagnetic metal powder, powder of Fe, Ni, Fe—Co, Fe—Ni, Co—Ni, Co—Ni—Fe, etc. may be used, and an alloy may be used, which contains aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, or bismuth by less than 20 weight % of the metal components. The ferromagnetic metal powder may contain small quantity of water, hydroxide or oxide. Method to manufacture the above ferromagnetic powder is already known, and the ferromagnetic powder used in the present invention can be manufactured by the method already known.

There is no special restriction on the shape of the ferromagnetic powder. Normally, the powder in needle-like shape, granular, cubic, grain-like or planar shape is used. In particular, it is preferable to use the ferromagnetic powder in needle-like shape.

The resin components, the curing agent and the ferromagnetic powder as described above are kneaded and dispersed with a solvent such as methylethylketone, dioxane, cyclohexanone, ethyl acetate, etc. used for preparation of magnetic coating material, and a magnetic coating material is prepared. Kneading and dispersion can be carried out by a generally known method.

In addition to the components as described above, the magnetic coating material may contain additive or filling material generally used including lubricating material, dispersion material, etc. such as fatty acid, fatty acid ester, silicone oil, etc. abrasive material such as α-Al$_2$O$_3$, Cr$_2$O$_3$, etc., or antistatic agent such as carbon black.

Next, description will be given on the lower non-magnetic layer or the lower magnetic layer in case the medium is designed in multi-layer arrangement. Inorganic powder used in the lower coating layer of the present invention may be magnetic or non-magnetic powder. For example, in case of non-magnetic powder, it can be selected from inorganic compounds such as metal oxide, metal carbonate, metal sulfate, metal nitride, metal carbide, metal sulfide, etc. As the inorganic compounds, the following compounds may be used in combination or alone: α-alumina with alpha ratio of 90 to 100%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. In particular, titanium dioxide, zinc oxide, iron oxide or barium oxide are preferably used, or more preferably, titanium dioxide. Average particle size of the non-magnetic powder is preferably 0.005 to 2 µm. When necessary, non-magnetic powder having different particle sizes may be combined, or non-magnetic powder having wider particle size distribution may be used alone to provide similar effects. In particular, it is preferable to use non-magnetic powder having average particle size of 0.01 to 0.2 µm. It is preferable that pH value of the non-magnetic powder is between 6 to 9. Specific surface area of the non-magnetic powder is 1 to 100 m$^2$/g, or preferably 5 to 50 m$^2$/g, or more preferably 7 to 40 m$^2$/g. Crystallite size of the non-magnetic powder is preferably 0.01 to 2 µm. Oil absorption using DBP is 5 to 100 ml/100 g, or preferably 10 to 80 ml/100 g, or more preferably 20 to 60 ml/100 g. Specific gravity is 1 to 12, or more preferably 3 to 6. Shape may be needle-like shape or spherical, polyhedron or planar shape.

It is preferable that surface treatment is performed on the surface of the non-magnetic powder using Al$_2$O$_3$, SiO$_2$, TiO$_2$, ZrO$_2$, SnO$_2$, Sb$_2$O$_3$, or ZnO. In particular, it is preferable to use Al$_2$O$_3$, SiO$_2$, TiO$_2$, or ZrO$_2$, or more preferably to use Al$_2$O$_3$, SiO$_2$, or ZrO$_2$. These may be used in combination or alone. Depending on the purpose, coprecipitated surface treatment layer may be used, or a method to treat with alumina and then to treat surface layer with silica or a method reversing this procedure may be adopted. The surface treatment layer may be porous layer according to the purpose, but it is generally preferable that the surface treatment layer is homogeneous and dense.

When carbon black is mixed in the lower coating layer, the value of Rs can be decreased as already known, and the desired micro Vickers hardness can be obtained. For this purpose, furnace black for rubber, thermal black for rubber, carbon black for color, acetylene black, etc. may be used.

Specific surface area of carbon black is 100 to 500 m$^2$/g, or preferably 150 to 400 m$^2$/g. DBP oil absorption is 20 to 400 ml/100 g, or more preferably 30 to 200 ml/100 g. Average particle size of carbon black is 5 to 80 nm, or preferably 10 to 50 nm, or more preferably 10 to 40 nm. It is preferable that pH value of carbon black is 2 to 10, moisture content is 0.1 to 10%, and tap density is 0.1 to 1 g/ml. Concrete examples of the carbon black used in the present invention are as follows: BLACKPEARLS 2000, 1300, 1000, 900, 800, 880, 700, VULCAN XC-72 (manufactured by Cabot), #3050B, 3150B, 3250B, #3750B, #3950B, #950, #650B, #970B, #850B, MA-600 (manufactured by Mitsubishi Chemical Co., Ltd.), CONDUCTEX SC, RAVEN 8800, 8000, 7000, 5750, 5250, 3500, 2100, 2000, 1800, 1500, 1255, 1250 (manufactured by Columbia Carbon Co.), and Ketchenblack EC (manufactured by Akzo Co.).

For the lower coating layer of the present invention, magnetic powder can also be used. As the magnetic powder, alloy having γ-Fe$_2$O$_3$, Co-denatured γ-Fe$_2$O$_3$ or α-Fe as major component or $CrO_2$, etc. may be used. In particular, it is preferable to use Co-modified $\gamma$-$Fe_2O_3$. Ferromagnetic powder to be used in the lower layer of the present invention has preferably composition and performance characteristics similar to those of the ferromagnetic powder used in the upper magnetic layer. However, performance is varied in the upper layer and the lower layer depending on the purpose as already known. For example, to improve long wavelength recording property, it is desirable that Hc of the lower magnetic layer is set to a value lower than that of the upper magnetic layer, and it is effective to set the value of Br of the lower magnetic layer to a value higher than that of the upper magnetic layer. In addition, it is possible to provide advantages by adoption of the multi-layer structure as already known.

For the binder, lubricant, dispersion agent, additive, solvent, dispersion method, etc. of the lower magnetic layer or the lower non-magnetic layer, those of the magnetic layer can be applied. In particular, for quantity and type of binder, adding quantity and type of additive and dispersion agent, the known technique relating to the magnetic layer can be applied.

The magnetic coating material prepared from the above materials is coated on a non-magnetic support member to form the magnetic layer.

As the non-magnetic support member to be used in the present invention, a product produced by biaxial stretching such as polyethylene naphthalate, polyethylene terephthalate, polyamide, polyimide, polyamideimide, aromatic polyamide, polybenzoxydazole, etc. may be used. Preferably, polyethylene naphthalate or aromatic polyamide is used. These non-magnetic support members may be processed in advance by corona discharge, plasma processing, adhesion processing, heat treatment, etc. Also, it is preferable that the non-magnetic support member used in the present invention has surface with such excellent smoothness that average surface roughness along central line is within the range of 0.1 to 20 nm, or more preferably 1 to 10 nm with cut-off value of 0.25 nm. It is also preferable that the non-magnetic support member has not only lower average surface roughness along central line but also no coarse projection of 1 $\mu$m or more.

To manufacture the magnetic recording medium of the present invention, for example, a coating solution of the magnetic layer is coated on the surface of the non-magnetic support member under running condition to have the layer thickness after drying of the magnetic layer to be within 0.05 to 5 $\mu$m, or more preferably within 0.07 to 1 $\mu$m. In this case, two or more magnetic coating materials may be coated in multiple layers sequentially or simultaneously.

As coating device for coating the magnetic layer coating solution as described above, air doctor coat, blade coat, rod coat, extrusion coat, air knife coat, squeeze coat, impregnation coat, reverse roll coat, transfer roll coat, gravure coat, kiss coat, cast coat, spray coat, spin coat, etc. can be used. For the details on these devices, reference should be made, for example, to "The Newest Coating Technique", published by Sogo Gijutsu Center, Co., Ltd. (May 31, 1983).

In case the present invention is applied to a magnetic recording medium having two or more layers, the following can be proposed as coating device and method:

(1) By a coating device for gravure, roll, blade, extrusion, etc. as commonly used in magnetic coating, the lower layer is coated at first, and while the lower layer is not yet dried, the upper layer is coated by a support member pressurizing type extrusion coating device as disclosed in JP(B) 89046186, JP(A) 60238179, JP 02265672, etc.

(2) The upper layer and the lower layer are coated almost at the same time by a coating head having two slits passing the coating solution as disclosed in JP(A) 6388080, JP(A) 02017971 or JP(A) 02265672.

(3) The upper layer and the lower layer are coated almost at the same time using an extrusion coating device with backup roll as disclosed in JP(A) 2174965.

On the surface not coated with the magnetic layer of the non-magnetic support member used in the present invention, a back coat layer (backing layer) may be provided. The back coat layer is a layer obtained by coating a back-coat coating material, which is prepared by dispersing granular components such as abrasive material, antistatic material, etc. and binder in organic solvent, and this is coated on the surface not coated with magnetic coating material of the non-magnetic support member. As the granular components, various types of inorganic pigments or carbon black may be used. As the binder, nitrocellulose, or resin such as phenoxy resin, vinyl chloride resin, polyurethane, etc. may be used alone or in mixing.

An adhesive layer may be provided on coating surface of the non-magnetic support member coated with the magnetic layer coating solution and the back-coat layer coating solution.

The coating layer coated with the magnetic layer coating solution is dried after magnetic field orientation has been performed for the ferromagnetic powder contained in the coating layer of the magnetic layer coating solution.

After drying as described above, the coating layer is processed by surface smoothening. For the surface smoothening, super-calender roll is used, for example. By performing surface smoothening, pores generated by removal of solvent during drying disappear, and filling ratio of the ferromagnetic powder in the magnetic layer is improved, and a magnetic recording medium with high electromagnetic transfer characteristics can be obtained.

As the calender roll, heat-resistant plastic roll made of epoxy, polyimide, polyamide, polyamideimide, etc. is used. Also, metal roll may be used.

The magnetic recording medium of the present invention preferably has a surface with such high smoothness that average roughness along central line of the surface is within 0.1 to 4 nm, or more preferably 1 to 3 nm, with a cut-off value of 0.25 mm. To obtain the smoothness, the above calender processing is performed on the magnetic layer, which is formed by selecting specific types of ferromagnetic powder and the binder as described above. As the calender processing condition, the temperature of the calender roll is maintained in the range of 60 to 100° C., or more preferably 70 to 100° C., or most preferably 80 to 100° C. The pressure is preferably 100 to 500 kg/cm, or more preferably 200 to 450 kg/cm, or most preferably 300 to 400 kg/cm.

The magnetic recording medium thus obtained can be cut to desired size using cutter and used.

The diester type lubricant of the present invention has excellent fluid lubricating property. Compared with an ester type lubricant, it has higher intermolecular interaction because two ester groups are present in a molecule. In case temperature increases due to heat of friction between the head rotating at high speed and the tape, it is hardly volatilized due to strong intermolecular interaction. Lubricating film is not broken, and stable fluid lubrication can be maintained. On the other hand, the diester of the present invention has high compatibility with polyurethane binder, and it is disadvantageous in that polyurethane binder is easily plasticized. By combining with the polyurethane containing the polar group of the present invention, it is possible to suppress plasticizing and to provide very good fluid lubricating property and mechanical strength of coating film surface without decreasing strength of the coating film. If the ring structure of aromatic ring or cycloaliphatic ring of the polyurethane is set to 2 to 8 mmol/g, the compatibility can be suppressed lower. Then, the plasticizing can be suppressed, and high mechanical strength can be provided to the coating film. For this reason, in the system for high density recording as currently used or for digital video system for business use, digital beta cam, D3, D5, or for digital video for home use (DVC), excellent still durability can be provided, and head contamination or output decrease in repeated running can be prevented.

Further, when diester of the present invention is combined with polyurethane binder containing the polar group, storage stability under high humidity condition can be improved. It is known that diester has high hydrophilic property and high moisture absorbing property and it is easily hydrolyzed, while it has been found that it has high resistance to hydrolysis in the magnetic coating film combined with the polyurethane containing the polar group. This may be attributed to the interaction between the ester group and the polyurethane polar group, which are present at positions adjacent to each other in neopentyl glycol in the diester compound of the present invention. As a result, it has been found that it has not only high stability when stored under high humidity condition but also very high still durability under high humidity conditions.

Unexpected effect is obtained when the diester compound of the present invention is combined with the polyurethane containing the polar group. That is, the smoothness of the coating surface is improved, and electromagnetic transfer characteristics are also improved. This is attributed to the fact that, by interaction of the polyurethane containing the polar group and diester compound in the coating solution and further with the solvent, fluid property of the coating solution, in particular viscosity under high shearing speed decreases, and that coating suitability is improved and coating surface is smoothened. This trend is particularly remarkable in a multi-layer type magnetic recording medium, which comprises multi-layer magnetic layer or magnetic layer and non-magnetic coating layer, and high electromagnetic transfer characteristics can be obtained.

In the following, more detailed description will be given on embodiments of the present invention.

In the following, the term "part(s)" means "weight part (s)", and the symbol "%" means "weight %".

EXAMPLES 1 to 10 AND COMPARATIVE EXAMPLES 1–5

Using an open kneader, 100 parts of ferromagnetic alloy powder (composition: Fe 92%, Zn 4%, Ni 4%; Hc 20000e, crystallite size 15 nm, BET specific surface area 59 m$^2$/g, longer axis diameter 0.12 $\mu$m, acicular ratio 7, σs140 emu/g) were pulverized for 10 minutes. Then, 7.5 parts of a compound ($SO_3Na=6\times10^{-5}$ eq/g; epoxy=$10^{-3}$ eq/g; Mw 30,000), which was obtained by adding hydroxyethyl sulfonate sodium salt to copolymer of vinyl chloride/vinyl acetate/glycidyl methacrylate (86:9:5), were kneaded with 10 parts (solid) of polyurethane resin of Table 2 and 60 parts of cyclohexanone for 60 minutes. Then, the following compounds were added:

Adhesive $Al_2O_3$ (particle size: 0.3 $\mu$m) 2 parts

Carbon black (particle size: 40 nm) 2 parts

Methylethylketone/toluene=1/1 200 parts and the mixture was dispersed in a sand mill for 120 minutes.

Then, the following compounds were added:

Polyisocyanate 5 parts (solid)
  (Nippon Polyurethane Co.; Coronate 3041)

Lubricant of Table 1 2 parts

Stearic acid 1 part

Methylethylketone 50 parts

The mixture was further agitated and mixed for 20 minutes and was then filtered using a filter having average pore size of 1 $\mu$m, and the coating solution for the upper magnetic layer was prepared. The magnetic layer coating solution thus obtained was coated on the surface of an aromatic polyamide support member of 6 $\mu$m in thickness using a reverse roll so that the thickness after drying is to be 2.5 $\mu$m. On the non-magnetic support member with the magnetic layer coating solution coated on it, magnetic field orientation was performed using a magnet of 3000 gauss while the magnetic layer coating solution is not yet dried.

On the non-magnetic support member with the coating solution for the upper magnetic layer coated on it, magnetic orientation was performed using a magnet of 3000 gauss when the coating solution was not yet dried. After drying, calender treatment (speed 100 m/min,; linear pressure 300 kg/cm; temperature 90° C.) was performed by combination of metal roll-metal roll-metal roll-metal roll-metal roll-metal roll-metal roll. Then, it was cut to have a width of 6.35 mm to prepare a videotape for DVC.

TABLE 1

| Lubricant No. | Chemical structure of lubricant |
|---|---|
| 1 | $CH_3(CH_2)_4COOCH_2C(CH_3)_2CH_2OCO(CH_2)_4CH_3$ |
| 2 | $CH_3(CH_2)_6COOCH_2C(CH_3)_2CH_2OCO(CH_2)_6CH_3$ |
| 3 | $CH_3(CH_2)_8COOCH_2C(CH_3)_2CH_2OCO(CH_2)_8CH_3$ |
| 4 | $CH_3(CH_2)_{10}COOCH_2C(CH_3)_2CH_2OCO(CH_2)_{10}CH_3$ |
| 5 | $CH_3(CH_2)_{12}COOCH_2C(CH_3)_2CH_2OCO(CH_2)_{12}CH_3$ |
| 6 | $CH_3(CH_2)_{16}COOCH_2C(CH_3)_2CH_2OCO(CH_2)_{16}CH_3$ |
| 7 | $CH_3(CH_2)_{20}COOCH_2C(CH_3)_2CH_2OCO(CH_2)_{20}CH_3$ |
| 8 | $CH_3CH(CH_3)(CH_2)_9COOCH_2C(CH_3)_2CH_2OCO(CH_2)_9CH(CH_3)CH_3$ |
| 9 | $CH_3(CH_2)_6COOCH_2CH_2OCO(CH_2)_6CH_3$ |
| 10 | $CH_3(CH_2)_3COOCH_2C(CH_3)_2CH_2OCO(CH_2)_3CH_3$ |
| 11 | $CH_3(CH_2)_{21}COOCH_2C(CH_3)_2CH_2OCO(CH_2)_{21}CH_3$ |

TABLE 1-continued

| Lubricant No. | Chemical structure of lubricant |
|---|---|
| 12 | $CH_3(CH_2)_{16}COO(CH_2)_3CH_3$ |
| 13 | $CH_3(CH_2)_{16}COOCH_2C(CH_3)_2CH_2OCO(CH_2)_{12}CH_3$ |

TABLE 2

| Polyurethane type | Polyol 1 Type | mol | Polyol 2 Type | mol | Chain extender 1 Type | mol | Chain extender 2 Type | mol | Chain extender 3 Type | mol | Diisocyanate Type | mol | Molecular weight Mw |
|---|---|---|---|---|---|---|---|---|---|---|---|---|---|
| A | Isophthalic acid/ Neopentyl glycol/ Cyclohexanediol | 0.07 | Poly-caprolactone | 0.33 | Neopentyl glycol | 0.1 | Hydrogenated bisphenol A | 0 | Cyclohexanediol | 0 | Diphenylmethane diisocyanate | 0.5 | 43000 |
| B | Isophthalic acid/ Neopentyl glycol/ Cyclohexanediol | 0.2 | Poly-caprolactone | 0.16 | Neopentyl glycol | 0.14 | Hydrogenated bisphenol A | 0 | Cyclohexanediol | 0 | Diphenylmethane diisocyanate | 0.5 | 38000 |
| C | Isophthalic acid/ Neopentyl glycol/ Cyclohexanediol | 0.34 | Poly-caprolactone | 0.01 | Neopentyl glycol | 0.15 | Hydrogenated bisphenol A | 0 | Cyclohexanediol | 0 | Diphenylmethane diisocyanate | 0.5 | 48000 |
| D | Isophthalic acid/ Neopentyl glycol/ Cyclohexanediol | 0 | Poly-caprolactone | 0 | Neopentyl glycol | 0.05 | Hydrogenated bisphenol A | 0.45 | Cyclohexanediol | 0 | Diphenylmethane diisocyanate | 0.5 | 57000 |
| E | Isophthalic acid/ Neopentyl glycol/ Cyclohexanediol | 0.2 | Poly-caprolactone | 0.16 | Neopentyl glycol | 0.14 | Hydrogenated bisphenol A | 0 | Cyclohexanediol | 0 | Diphenylmethane diisocyanate | 0.5 | 36000 |
| F | Isophthalic acid/ Neopentyl glycol/ Cyclohexanediol | 0.2 | Poly-caprolactone | 0.16 | Neopentyl glycol | 0.14 | Hydrogenated bisphenol A | 0 | Cyclohexanediol | 0 | Diphenylmethane diisocyanate | 0.5 | 45000 |
| G | Isophthalic acid/ Neopentyl glycol/ Cyclohexanediol | 0.2 | Poly-caprolactone | 0.16 | Neopentyl glycol | 0.14 | Hydrogenated bisphenol A | 0 | Cyclohexanediol | 0 | Diphenylmethane diisocyanate | 0.5 | 36000 |
| H | Isophthalic acid/ Neopentyl glycol/ Cyclohexanediol | 0 | Poly-caprolactone | 0.45 | Neopentyl glycol | 0.05 | Hydrogenated bisphenol A | 0 | Cyclohexanediol | 0 | Diphenylmethane diisocyanate | 0.5 | 47000 |
| I | Isophthalic acid/ Neopentyl glycol/ Cyclohexanediol | 0 | Poly-caprolactone | 0 | Neopentyl glycol | 0 | Hydrogenated bisphenol A | 0 | Cyclohexanediol | 0.5 | Diphenylmethane diisocyanate | 0.5 | 56000 |
| J | Isophthalic acid/ Neopentyl glycol/ Cyclohexanediol | 0.2 | Poly-caprolactone | 0.16 | Neopentyl glycol | 0.14 | Hydrogenated bisphenol A | 0 | Cyclohexanediol | 0 | Diphenylmethane diisocyanate | 0.5 | 52000 |

EXAMPLES 11 AND 12 AND COMPARATIVE EXAMPLES 6 to 8

Preparation of Upper Magnetic Layer Coating Solution

By the same procedure as in Example 1, a magnetic layer coating solution was prepared using polyurethane and the lubricants of Tables 1 and 2.

Preparation of Coating Solution for the Lower Coating Layer

Using an open kneader, 85 parts of titanium oxide (average particle size 0.035 μm; crystal type rutile; $TiO_2$ content 90% or more; surface treatment layer: alumina; $S_{BET}$ 35 to 42 m$^2$/g; true specific gravity 4.1; pH 6.5 to 8.0) were pulverized for 10 minutes. Then, 11 parts of a compound ($SO_3Na=6\times10^{-5}$ eq/g; epoxy=$10^{-3}$ eq/g; Mw 30,000), which was obtained by adding hydroxyethyl sulfonate sodium salt to copolymer of vinyl chloride/vinyl acetate/glycidyl methacrylate (86:9:5), were kneaded with 10 parts (solid) of polyurethane containing sulfonic acid (Toyobo; UR8700) and 60 parts of cyclohexanone for 60 minutes. Then, Methylethylketone/cyclohexanone=6/4 200 parts were added, and the mixture was dispersed in a sand mill for 120 minutes. Further, the following compounds were added:

Butyl stearate 2 parts
Stearic acid 1 part
Methylethylketone 50 parts

After agitating and mixing further for 20 minutes, the mixture was filtered using a filter having average bore size of 1 μm, and a coating solution for the lower coating layer was prepared.

The lower non-magnetic layer coating solution thus obtained was coated in thickness of 2.0 μm, and immediately thereafter, the magnetic coating material was coated on the surface of an aromatic polyamide support member of 10 μm in thickness using a reverse roll by simultaneous multi-layer coating so that the thickness when dried is to be 0.1 μm. On the non-magnetic support member with the coating solution for the upper magnetic layer coated on it, magnetic orientation was performed using a magnet of 3000 gauss when the coating solution was not yet dried. After drying, calender treatment (speed 100 m/min,; linear pressure 300 kg/cm; temperature 90° C.) was performed by combination of metal roll-metal roll-metal roll-metal roll-metal roll-metal roll. Then, it was cut to have a width of 6.35 mm. The properties of the magnetic recording media of the examples and comparative examples thus obtained were measured by the measuring method given below. The results of the measurements are summarized in Table 3.

TABLE 3

|  | Lubricant type | Polyurethane Type | Polyurethane Polar group | Polyurethane Polar group content (eq/g) | Ring conc. mmol/g | Magnetic layer |
|---|---|---|---|---|---|---|
| Example 1 | 1 | A | SO$_3$NA | 6 × 10$^{-5}$ | 2 | Single layer |
| Example 2 | 2 | B | COOH | 2 × 10$^{-4}$ | 4 | Single layer |
| Example 3 | 3 | C | SO$_3$Na | 3 × 10$^{-5}$ | 6 | Single layer |
| Example 4 | 4 | D | SO$_3$Na | 8 × 10$^{-5}$ | 8 | Single layer |
| Example 5 | 5 | E | PO$_3$K$_2$ | 1 × 10$^{-6}$ | 4 | Single layer |
| Example 6 | 6 | F | N(CH$_3$)$_2$ | 1.5 × 10$^{-4}$ | 4 | Single layer |
| Example 7 | 7 | G | Sulfobetaine | 8 × 10$^{-5}$ | 4 | Single layer |
| Example 8 | 8 | A | SO$_3$Na | 6 × 10$^{-5}$ | 2 | Single layer |
| Example 9 | 3 | H | SO$_3$Na | 6 × 10$^{-5}$ | 1 | Single layer |
| Example 10 | 3 | I | SO$_3$Na | 6 × 10$^{-5}$ | 9 | Single layer |
| Comparative example 1 | 9 | C | SO$_3$Na | 3 × 10$^{-5}$ | 6 | Single layer |
| Comparative example 2 | 10 | C | SO$_3$Na | 3 × 10$^{-5}$ | 6 | Single layer |
| Comparative example 3 | 11 | C | SO$_3$Na | 3 × 10$^{-5}$ | 6 | Single layer |
| Comparative example 4 | 12 | C | SO$_3$Na | 3 × 10$^{-5}$ | 6 | Single layer |
| Comparative example 5 | 3 | J | None | 0 | 4 | Single layer |
| Example 11 | 3 | C | SO$_3$Na | 3 × 10$^{-5}$ | 6 | Multilayer |
| Example 12 | 6 | F | N(CH$_3$)$_2$ | 1.5 × 10$^{-4}$ | 4 | Multilayer |

TABLE 3-continued

|  | Lubricant type | Polyurethane Type | Polyurethane Polar group | Polyurethane Polar group content (eq/g) | Ring conc. mmol/g | Magnetic layer |
|---|---|---|---|---|---|---|
| Comparative example 6 | 12 | C | SO$_3$Na | 3 × 10$^{-5}$ | 6 | Multilayer |
| Comparative example 7 | 9 | C | SO$_3$Na | 3 × 10$^{-5}$ | 6 | Multilayer |
| Comparative example 8 | 3 | J | None | 0 | 4 | Multilayer |

|  | Electromag. transfer charac. (C/N) dB | Surface roughness Ra nm | Still durability 23° C., 50% RH (min) | Still durability 23° C., 80% RH (min) | After storage (min) | Head contamination |
|---|---|---|---|---|---|---|
| Example 1 | 1.1 | 2.7 | 120 or more | 120 or more | 120 or more | Excellent |
| Example 2 | 1 | 2.5 | 120 or more | 120 or more | 120 or more | Excellent |
| Example 3 | 0.9 | 2.6 | 120 or more | 120 or more | 120 or more | Excellent |
| Example 4 | 1.1 | 2.7 | 120 or more | 120 or more | 120 or more | Excellent |
| Example 5 | 1.2 | 2.6 | 120 or more | 120 or more | 120 or more | Excellent |
| Example 6 | 1 | 2.5 | 120 or more | 120 or more | 120 or more | Excellent |
| Example 7 | 1.1 | 2.4 | 120 or more | 120 or more | 120 or more | Excellent |
| Example 8 | 1 | 2.3 | 120 or more | 120 or more | 120 or more | Excellent |
| Example 9 | 0.7 | 3 | 120 or more | 120 or more | 120 or more | Good |
| Example 10 | 0.6 | 3.1 | 120 or more | 120 or more | 120 or more | Good |
| Comparative example 1 | 0 | 3.5 | 38 | 18 | 12 | No good |
| Comparative example 2 | 0 | 3.5 | 41 | 21 | 35 | No good |
| Comparative example 3 | −0.3 | 3.7 | 32 | 16 | 25 | No good |
| Comparative example 4 | −0.1 | 3.6 | 29 | 12 | 8 | No good |
| Comparative example 5 | −0.6 | 4.2 | 38 | 20 | 15 | No good |
| Example 11 | 1.9 | 1.7 | 120 or more | 120 or more | 120 or more | Excellent |
| Example 12 | 2 | 1.5 | 120 or more | 120 or more | 120 or more | Excellent |
| Comparative example 6 | 0.4 | 3.1 | 5 | 3 | 1 | No good |
| Comparative example 7 | 0.4 | 3 | 6 | 2 | 1 | No good |
| Comparative example 8 | 0.1 | 3.4 | 2 | 1 | 1 | No good |

[Measuring method]

(1) ectromagnetic transfer characteristics: Using a drum tester on a specimen tape, recording and reproduction were performed at recording wavelength of 0.5 μm and head speed of 10 m/sec. Using a standard tape (comparative example 1), relative C/N was evaluated by regarding C/N of the standard tape as 0 dB.

(2) Surface roughness Ra: By optical interference method using digital optical profimeter (manufactured by WYKO), average roughness at central line was measured under cut-off value of 0.25 mm, and this was considered as Ra.

(3) Still durability: Under the condition of 23° C. and 50% relative humidity, using a digital video recorder (Matsushita Electric; NV-BJ1), the time until reproduction output is turned to 50% of the recorded signal (still durability time) under still condition was measured.

Still durability after storage: The tape set on a cassette was stored for 4 weeks under the conditions of 60° C. and 90% relative humidity, and still durability was evaluated by the above procedure under the conditions of 23° C. and 50% relative humidity.

(4) Head contamination: Using VTR of (3) above, a tape of 60-minute length was repeatedly and continuously run by 100 times under the condition of 40° C. and 10% relative humidity, and contamination of video head was checked.

| Excellent | No head contamination was observed. |
| Good | Head contamination was not observed by visual inspection. |
| No good | Head contamination was found by visual inspection. |

As described above, a lubricant having a specific chemical structure is used in the present invention. As a result, still durability is improved, and in particular, still durability under high humidity condition is improved. The magnetic recording medium of the present invention has excellent storage property under high temperature and high humidity conditions and exhibits no deterioration of still durability after storage. Head contamination due to repeated running is decreased and smoothness of the coating film is improved. Electromagnetic transfer characteristics are also improved.

What is claimed is:

1. A magnetic recording medium, comprising a non-magnetic support member and at least one magnetic layer, said at least one magnetic layer comprising magnetic particles, a binder and a diester compound as a lubricant, said binder comprising a polyurethane resin having at least one polar group, and said diester compound having the following structural formula:

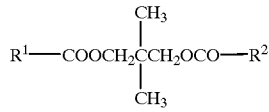

wherein $R^1$ and $R^2$ each represents a hydrocarbon group having 5 to 21 carbon atoms and wherein said binder contains at least one of an aromatic ring polyurethane resin or a cycloaliphatic ring polyurethane resin having an aromatic or cycloaliphatic ring content of 2 to 9 mmol/g.

2. A magnetic recording medium according to claim 1, wherein said magnetic particles have a longer axis diameter of 0.05 to 0.25 μm.

3. A magnetic recording medium according to claim 1, wherein said magnetic particles have a crystallite size of 12 to 25 μm.

4. A magnetic recording medium according to claim 1, wherein $R^1$ and $R^2$ of the diester compound represent a saturated straight-chain alkyl group or a saturated branched alkyl group.

5. A magnetic recording medium according to claim 1, wherein said at least one polar group is selected from the group consisting of a carboxylic acid, a sulfonic acid, a phosphoric acid, a salt of any of said acids, sulfobetaine, carbobetaine, an amine and ammonium base.

6. A magnetic recording medium according to claim 1, wherein said at least one polar group is present in an amount of $1 \times 10^{-6}$ to $2 \times 10^{-4}$ eq/g based on the polyurethane resin.

7. A magnetic recording medium according to claim 1, wherein the diester compound is present in an amount of from 0.1 to 10 parts per 100 parts of magnetic particles.

8. A magnetic recording medium comprising a non-magnetic support member, a magnetic layer and a lower layer, said magnetic layer comprising magnetic particles and a binder and having a thickness of up to 1 μm, said lower layer comprising inorganic non-magnetic powder, a binder and a diester compound as a lubricant, said lower layer provided between the non-magnetic support member and the magnetic layer, said lower layer binder comprising a polyurethane resin having at least one polar group and said diester compound having the following structural formula:

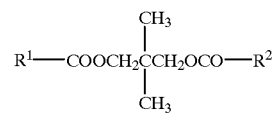

wherein $R^1$ and $R^2$ each represents a hydrocarbon group having 5 to 21 carbon atoms, and wherein said binder contains a least one of an aromatic ring polyurethane resin or a cycloaliphatic ring polyurethane resin having an aromatic or cycloaliphatic ring content of 2 to 9 mmol/g.

9. A magnetic recording medium according to claim 8, wherein said non-magnetic powder of said lower layer has a pH value of 6 to 9.

10. A magnetic recording medium according to claim 8, wherein said non-magnetic powder of said lower layer has an oil absorption using DBP in the range of 5 to 100 ml/100 g.

11. A magnetic recording medium according to claim 8, wherein said non-magnetic powder of said lower layer has a specific surface area of 5 to 100 m$^2$/g.

12. A magnetic recording medium according to claim 8, wherein said non-magnetic powder of said lower layer has a specific gravity of 3 to 6.

13. A magnetic recording medium according to claim 8, wherein said lower layer includes carbon black having a specific surface area of 100 to 500 m$^2$/g and a specific gravity of 3 to 6.

14. A magnetic recording medium according to claim 8, wherein said non-magnetic powder of said lower layer has its surface processed by surface treatment using at least one of $Al_2O_3$, $SiO_2$, $TiO_2$, $ZrO_2$, $SnO_2$, $Sb_2O_3$, or ZnO.

15. A magnetic recording medium according to claim 8, wherein $R^1$ and $R^2$ of the diester compound represent a saturated straight-chain alkyl group or a saturated branched alkyl group.

16. A magnetic recording medium according to claim 8, wherein said at least one polar group is selected from the group consisting of a carboxylic acid, a sulfonic acid, a phosphoric acid, a salt of any of said acids, sulfobetaine, carbobetaine, an amine and ammonium base.

17. A magnetic recording medium according to claim 8, wherein said at least one polar group is present in an amount of $1 \times 10^{-6}$ to $2 \times 10^{-4}$ eq/g based on the polyurethane resin.

18. A magnetic recording medium according to claim 8, wherein the diester compound is present in an amount of from 0.1 to 10 parts per 100 parts of non-magnetic powder.

* * * * *